(12) United States Patent
Canik et al.

(10) Patent No.: US 11,162,404 B2
(45) Date of Patent: Nov. 2, 2021

(54) SYSTEMS AND METHODS FOR CONVERTING SHEAR FLOW INTO AXIAL FLOW IN AN EXHAUST SYSTEM

(71) Applicant: CUMMINS EMISSION SOLUTIONS INC., Columbus, IN (US)

(72) Inventors: Jacob D. Canik, Madison, WI (US); Corey Verseman, Fitchburg, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 16/913,426

(22) Filed: Jun. 26, 2020

(65) Prior Publication Data

US 2021/0003058 A1 Jan. 7, 2021

Related U.S. Application Data

(60) Provisional application No. 62/869,678, filed on Jul. 2, 2019.

(51) Int. Cl.
| | |
|---|---|
| *F01N 3/28* | (2006.01) |
| *F01N 5/04* | (2006.01) |
| *B01D 53/94* | (2006.01) |
| *F02B 37/00* | (2006.01) |

(52) U.S. Cl.
CPC ....... *F01N 3/2892* (2013.01); *B01D 53/9418* (2013.01); *F01N 5/04* (2013.01); *F02B 37/00* (2013.01); *F01N 2330/02* (2013.01)

(58) Field of Classification Search
CPC ...... F01N 3/2892; F01N 5/04; F01N 2330/02; B01D 53/9418
USPC .............................................. 422/176; 60/274
See application file for complete search history.

(56) References Cited

U.S. PATENT DOCUMENTS

| | | | | |
|---|---|---|---|---|
| 5,043,146 | A * | 8/1991 | Ishikawa | ............... F01N 3/2892 422/176 |
| 2011/0094206 | A1* | 4/2011 | Liu | ..................... B01F 3/04049 60/274 |
| 2014/0099248 | A1* | 4/2014 | Broderick | .............. B01D 53/90 423/239.1 |
| 2015/0101313 | A1* | 4/2015 | Mitchell | ............... F01N 3/2066 60/274 |
| 2017/0211449 | A1* | 7/2017 | Gockel | ................. B01F 5/0616 |

* cited by examiner

*Primary Examiner* — Tom P Duong
(74) *Attorney, Agent, or Firm* — Foley & Lardner LLP

(57) ABSTRACT

An aftertreatment system includes an exhaust conduit and a vane plate. The vane plate is located in the exhaust conduit. The vane plate includes a plurality of first vanes. The vane plate includes a plurality of second vanes that intersects the plurality of first vanes. The plurality of first vanes and the plurality of second vanes form a plurality of channels. The vane plate is configured to redirect flow of exhaust gas through the exhaust conduit to be in an axial direction of the exhaust conduit.

13 Claims, 11 Drawing Sheets

SYSTEMS AND METHODS FOR CONVERTING SHEAR FLOW INTO AXIAL FLOW IN AN EXHAUST SYSTEM

CROSS-REFERENCE TO RELATED APPLICATIONS

The present application claims the benefit of U.S. Provisional Application No. 62/869,678, filed Jul. 2, 2019, the entire contents of which are incorporated herein by reference.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a liquid reductant. The catalyst may be included in a catalyst chamber of an exhaust system, such as that of a vehicle or power generation unit. A liquid reductant, such as anhydrous ammonia, aqueous ammonia, diesel exhaust fluid (DEF), or aqueous urea, is typically introduced into the exhaust gas flow prior to the catalyst chamber.

In some applications, high shear velocities of exhaust gas can lead to SCR catalyst erosion. Erosion of the SCR catalyst can reduce system performance in the presence of non-decomposed DEF deposits. Additionally, the flow of exhaust gases exiting a turbocharger outlet can have a high rotational velocities. These high rotational velocities can damage the SCR catalyst in certain applications.

SUMMARY

Embodiments described herein relate generally to systems and methods for converting shear flow into axial flow in an exhaust system.

At least one aspect of the present disclosure is directed to an aftertreatment system. The aftertreatment system includes an exhaust conduit and a vane plate located in the exhaust conduit. The vane plate includes a plurality of first vanes and a plurality of second vanes that intersect the plurality of first vanes. The plurality of first vanes and the plurality of second vanes form a plurality of channels. The vane plate is configured to redirect flow of exhaust gas through the exhaust conduit to be in an axial direction of the exhaust conduit.

In some embodiments, an angle between a first direction in which the plurality of first vanes extend and a second direction in which the plurality of second vanes extend is in a range of 80° to 100°. In some embodiments, each of the plurality of channels has a rectangular cross-section. In some embodiments, each of the plurality of channels has a depth in a range of 10 mm to 80 mm in the axial direction of the exhaust conduit. In some embodiments, each of the plurality of channels has a length and a width in a range of 5 mm to 105 mm in a direction perpendicular to the axial direction of the exhaust conduit.

In some embodiments, a ratio of a cross-sectional area of the plurality of channels perpendicular to the axial direction of the exhaust conduit to a cross-sectional area of the vane plate perpendicular to the axial direction of the exhaust conduit is greater than 60%. In some embodiments, the system includes a turbocharger configured to output the exhaust gas. In some embodiments, the system includes a catalyst unit and a turbocharger configured to output the exhaust gas to the SCR unit. The vane plate can be located downstream of the turbocharger and upstream of the catalyst unit. In some embodiments, the plurality of first vanes extend in radial directions from a central hub and the plurality of second vanes extend concentrically around the central hub. In some embodiments, each of the plurality of channels has a depth in a range of 10 mm to 80 mm in the axial direction of the exhaust conduit. In some embodiments, each of the plurality of channels has a sector-shaped cross-section or an annular sector-shaped cross-section.

Another aspect of the present disclosure is directed to a vane plate assembly. The vane plate assembly includes a vane plate configured to couple with an exhaust conduit. The vane plate includes a plurality of first vanes and a plurality of second vanes that intersect the plurality of first vanes. The plurality of first vanes and the plurality of second vanes form a plurality of channels. The vane plate is configured to redirect flow of exhaust gas through the exhaust conduit to be in an axial direction of the exhaust conduit.

In some embodiments, an angle between a first direction in which the plurality of first vanes extend and a second direction in which the plurality of second vanes extend is in a range of 80° to 100°. In some embodiments, each of the plurality of channels has a rectangular cross-section. In some embodiments, each of the plurality of channels has a depth in a range of 10 mm to 80 mm in the axial direction of the exhaust conduit. In some embodiments, each of the plurality of channels has a length and a width in a range of 5 mm to 105 mm in a direction perpendicular to the axial direction of the exhaust conduit. In some embodiments, a ratio of a cross-sectional area of the plurality of channels perpendicular to the axial direction of the exhaust conduit to a cross-sectional area of the vane plate perpendicular to the axial direction of the exhaust conduit is greater than 60%. In some embodiments, the plurality of first vanes extend in radial directions from a central hub and the plurality of second vanes extend concentrically around the central hub. In some embodiments, each of the plurality of channels has a sector-shaped cross-section or an annular sector-shaped cross-section.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for converting shear flow into axial flow in an exhaust system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated within an aftertreatment system. This treatment often includes treating (e.g., dosing, etc.) the exhaust gases with a reductant and an SCR catalyst to convert $NO_x$ emissions to more neutral compounds. In some applications, high shear velocities of exhaust gas can lead to SCR catalyst erosion. Erosion of the SCR catalyst can reduce system performance in the presence of non-decomposed DEF of DEF deposits. Additionally, the flow of exhaust gases exiting a turbocharger outlet can have a high rotational velocities. These high rotational velocities can damage the SCR catalyst in certain applications.

Implementations described herein relate to an aftertreatment system that includes an exhaust conduit and a vane plate located in the exhaust conduit. The vane plate includes a plurality of first vanes and a plurality of second vanes that intersects the first direction. The plurality of first vanes and the plurality of second vanes form a plurality of channels. The vane plate is configured to redirect flow of exhaust gas through the exhaust conduit to be in an axial direction of the exhaust conduit.

The aftertreatment system described herein may decrease costs compared to conventional systems because reducing or preventing SCR catalyst erosion can extend the lifetime of the catalyst and exhaust pipe. Additionally, reducing the rotational flow of exhaust gases can reduce the risk of SCR catalyst damage. As a result, the aftertreatment system may reduce expenses relative to conventional systems.

II. Overview of Aftertreatment System

Figure 1:
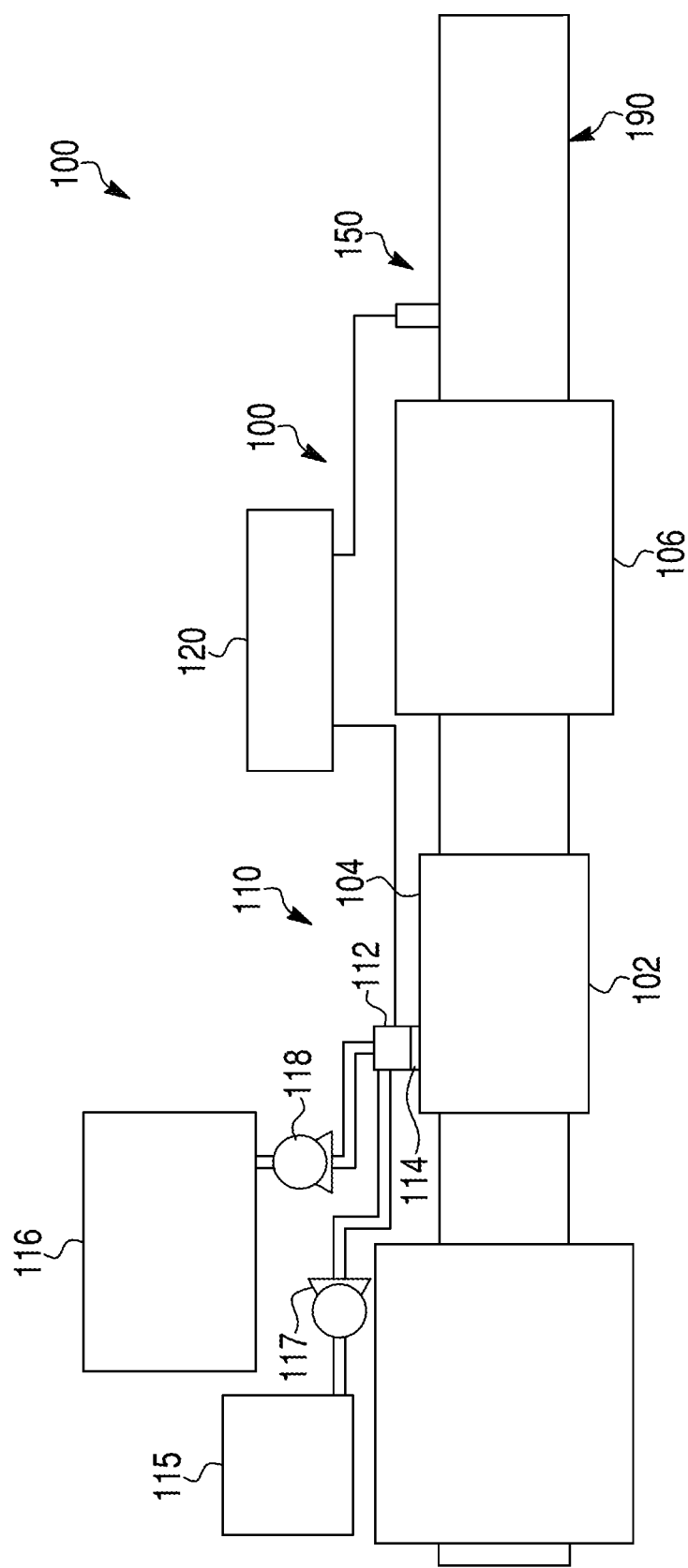
FIG. 1 illustrates a block diagram of an example aftertreatment system having an example reductant delivery system for an exhaust system, according to an embodiment.

FIG. 1 depicts an aftertreatment system 100 having an example reductant delivery system 110 for an exhaust system 190. The exhaust system 190 receives exhaust gasses from an internal combustion engine (e.g., diesel internal combustion engine, etc.). The aftertreatment system 100 includes a particulate filter (e.g., a diesel particulate filter (DPF) 102), the reductant delivery system 110, a decomposition chamber 104 (e.g., reactor, etc.), and a selective catalytic reduction unit 106 (e.g. catalyst chamber). The selective catalytic reduction (SCR) unit 106 can contain a catalyst (e.g. SCR catalyst). The aftertreatment system 100 may also include a sensor 150.

The DPF 102 is configured to remove particulate matter, such as soot, from exhaust gas flowing in the exhaust system 190. The DPF 102 includes an inlet, where the exhaust gas is received (e.g., from an engine manifold, etc.), and an outlet, where the exhaust gas exits after having particulate matter substantially filtered from the exhaust gas and/or converting the particulate matter into carbon dioxide. In some implementations, the DPF 102 may be omitted.

The decomposition chamber 104 is configured to convert a reductant, such as urea or DEF, into ammonia. The decomposition chamber 104 includes a reductant delivery system 110 having a dosing module 112 (e.g., doser, etc.) configured to dose the reductant into the decomposition chamber 104. In some implementations, the reductant is injected upstream of the SCR unit 106 (e.g. catalyst unit). The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or reductant to flow to the SCR unit 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 on which the dosing module 112 is mounted. The dosing module 112 is fluidly coupled to one or more reductant sources 116 (e.g., tanks, vessels, etc.). In some implementations, a pump 118 may be used to pressurize the reductant from the reductant sources 116 for delivery to the dosing module 112.

The dosing module 112 is also fluidly coupled to one or more air sources 115. For example, the air sources 115 may be an air intake or air storage device (e.g., tank, etc.). A pump 117 (e.g., lift pump, etc.) is used to pressurize the air from the air sources 115 for delivery to the dosing module 112 (e.g., via pressurized conduits, etc.). The dosing module 112 mixes the air from the air sources 115 and the reductant from the reductant sources 116 and provides the air-reductant mixture into the decomposition chamber 104.

The dosing module 112, the pump 117, and the pump 118 are also electrically or communicatively coupled to a controller 120. The controller 120 is configured to control the dosing module 112 to dose the air-reductant mixture into the decomposition chamber 104. The controller 120 may also be configured to control the pump 117 and/or the pump 118. For example, the controller 120 may control the pump 117 and the pump 118 to obtain a target mixture of air and reductant that is provided to the decomposition chamber 104. In some implementations, the pump 117 and the air sources 115 may be omitted. In these implementations, the dosing module 112 does not receive pressurized air.

The controller 120 may include a microprocessor, an application-specific integrated circuit (ASIC), a field-programmable gate array (FPGA), etc., or combinations thereof. The controller 120 may include memory, which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 120 can read instructions. The instructions may include code from any suitable programming language.

The SCR unit 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR unit 106 includes an inlet in fluid communication with the decomposition chamber 104 from which exhaust gas and reductant are received and an outlet in fluid communication with an end of the exhaust system 190.

The exhaust system 190 may further include an oxidation catalyst (for example a diesel oxidation catalyst (DOC)) in fluid communication with the exhaust system 190 (e.g., downstream of the SCR unit 106 or upstream of the DPF 102) to oxidize hydrocarbons and carbon monoxide in the exhaust gas.

In some implementations, the DPF 102 may be positioned downstream of the decomposition chamber 104. For instance, the DPF 102 and the SCR unit 106 may be combined into a single unit. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190; for example, a tip of the sensor 150 may extend into a portion of the exhaust system 190. In other implementations, the sensor 150 may receive exhaust gas through another conduit, such as one or more sample pipes extending from the exhaust system 190. While the sensor 150 is depicted as positioned downstream of the SCR unit 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR unit 106, within the SCR unit 106, or downstream of the SCR unit 106. In addition, two or more sensors 150 may be utilized for detecting a condition of the exhaust gas, such as two, three, four, five, or six sensors 150 with each sensor 150 located at one of the foregoing positions of the exhaust system 190. In some implementations, the sensors 150 may be omitted.

III. Example System for Converting Shear Flow into Axial Flow

Figure 2:
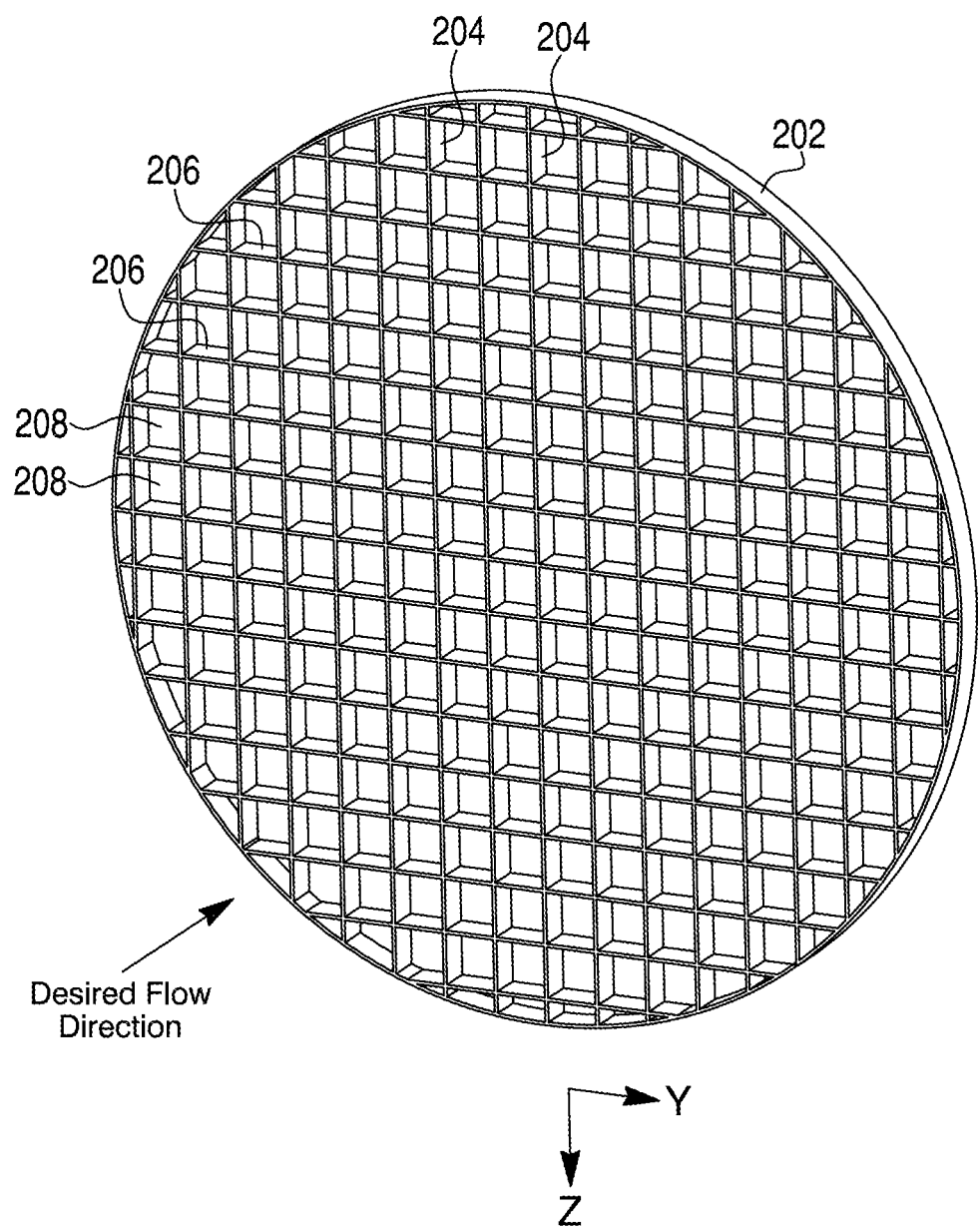
FIG. 2 illustrates a perspective view of an example vane plate for converting shear flow into axial flow, according to an embodiment.
Figure 3:
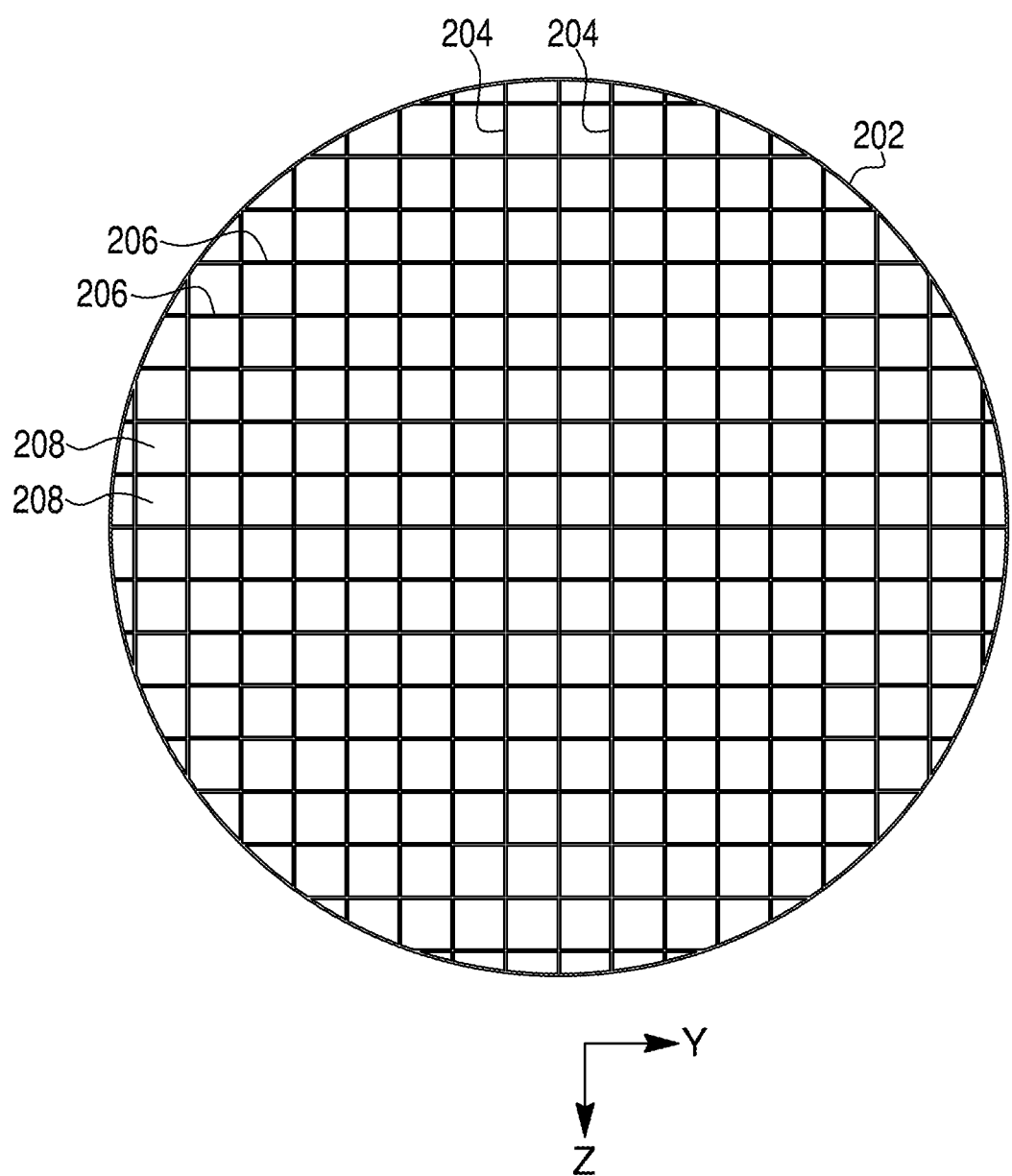
FIG. 3 illustrates a front view of the vane plate illustrated in FIG. 2, according to an embodiment.

FIG. 2 depicts a perspective view of an example vane plate 202 (e.g., vane plate assembly) for converting shear flow into axial flow according to an embodiment. FIG. 3 depicts a front view of the vane plate 202 illustrated in FIG. 2. The vane plate 202 can be any shape (e.g., a circle, disk, cylinder, etc.) to fit into a conduit. The vane plate 202 can cover an entire cross-sectional area of the conduit or partial cross-sectional area of the conduit. For example, the vane plate 202 can cover half of the cross-sectional area of the conduit. The vane plate 202 can cover an entire cross-sectional area of the exhaust manifold or partial cross-sectional area of the exhaust manifold. For example, the vane plate 202 can cover half of the cross-sectional area of the exhaust manifold. The vane plate 202 can be composed of a structural material to withstand various flows (e.g., exhaust gas flow). For example, the vane plate 202 can be composed of materials that include, but are not limited to, metals (e.g., stainless steel, castings, etc.), ceramics, or polymers.

The vane plate 202 includes a plurality of first vanes 204. In some embodiments, the plurality of first vanes 204 can extend in a z-direction. The z-direction can be a first direction. The plurality of first vanes 204 can be substantially parallel to each other. The plurality of first vanes 204 can have different lengths. For example, the plurality of first vanes 204 can have lengths equal to a chord of a circle formed by the vane plate 202.

The vane plate 202 includes a plurality of second vanes 206. In some embodiments, the plurality of second vanes 206 can extend in a y-direction. The y-direction can be a second direction. The plurality of second vanes 206 can be substantially parallel to each other. The plurality of second vanes 206 can have different lengths. For example, the plurality of second vanes 206 can have lengths equal to a chord of a circle formed by the vane plate 202. The plurality of second vanes 206 extend in a y-direction that intersects the z-direction. The plurality of second vanes 206 can intersect the plurality of first vanes 204.

The plurality of first vanes 204 and the plurality of second vanes 206 form a plurality of channels 208. A flow of exhaust gas can pass through the plurality of channels 208. The plurality of first vanes 204 and the plurality of second vanes 206 may be integral with one another, so as to be formed of a single piece.

Figure 4:
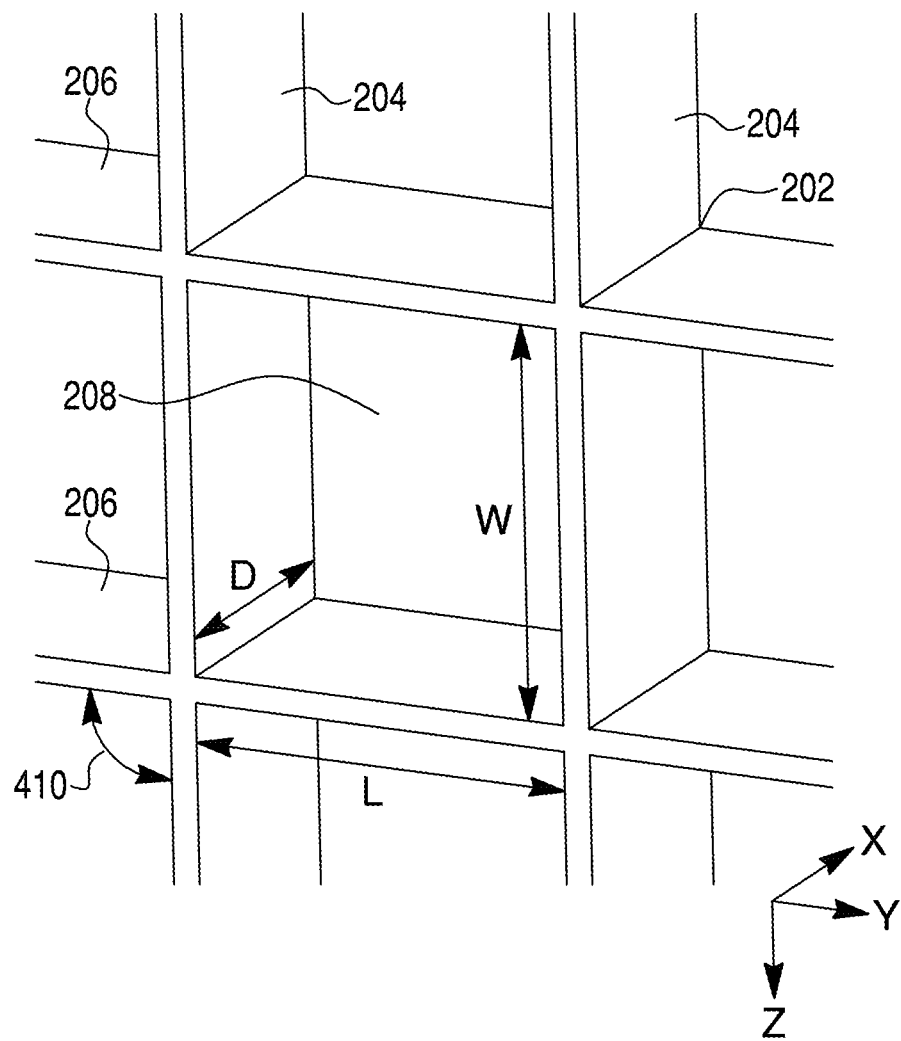
FIG. 4 illustrates a close-up perspective view of a portion of the vane plate illustrated in FIG. 2, according to an embodiment.

FIG. 4 depicts a close-up perspective view of a portion of the vane plate 202 illustrated in FIG. 2. The plurality of channels 208 can have a depth D in a range of 10 mm to 80 mm in an x-direction of a conduit. For example, the plurality of channels 208 can have a depth D of 10 mm, 20 mm, 30 mm, 40 mm, 50 mm, 60 mm, 70 mm, or 80 mm. The x-direction can be an axial direction. The plurality of channels 208 can have a length L and a width W in a range of 5 mm to 105 mm. For example, the plurality of channels 208 can have a length L of 5 mm, 15 mm, 25 mm, 35 mm, 45 mm, 55 mm, 65 mm, 75 mm, 85 mm, 95 mm, or 105 mm. The plurality of channels 208 can have a width W of 5 mm, 15 mm, 25 mm, 35 mm, 45 mm, 55 mm, 65 mm, 75 mm, 85 mm, 95 mm, or 105 mm. The length L and width W may be in direction perpendicular to the depth D. In the embodiment shown in FIG. 4, the length L and width W of each channel are the same. However, in other embodiments, the length L may be different than the width W. In yet another embodiment, the plurality of channels 208 can have a non-uniform geometry. For example, the plurality of channels 208 can have a variable depth D, variable length L or variable width W based on a non-uniform shear flow across a cross-sectional area of the vane plate 202. While the plurality of channels 208 in FIG. 4 are shown to be square in a cross-section perpendicular to the direction of the depth D, other shapes are possible. In some embodiments, the cross-section of the plurality of channels 208 is rectangular. For example, the plurality of channels 208 may have a rectangular shape in which the length L is greater than the width W (or vice versa), or may have a circular, triangular, pentagonal, or hexagonal shape.

In some embodiments, an angle α 410 between the z-direction in which the plurality of first vanes 204 extend and the y-direction in which the plurality of second vanes 206 extend can be in a range of 80° to 100° (e.g., 80°, 85°, 90°, 95°, 100°, etc.). The plurality of first vanes 204 can intersect the plurality of second vanes 206 at various angles, including the angle α 410.

In some embodiments, a ratio of a cross-sectional area of the plurality of channels 208 perpendicular to the x-direction of a conduit to a cross-sectional area of the vane plate 202 perpendicular to the x-direction of the conduit is greater than 60%. For example, the ratio of the cross-sectional area of the plurality of channels 208 perpendicular to the x-direction of a conduit to a cross-sectional area of the vane plate 202 perpendicular to the x-direction of the conduit can be 65%, 70%, 75%, 80%, 85%, 90%, 95%, or 99%.

Figure 5:
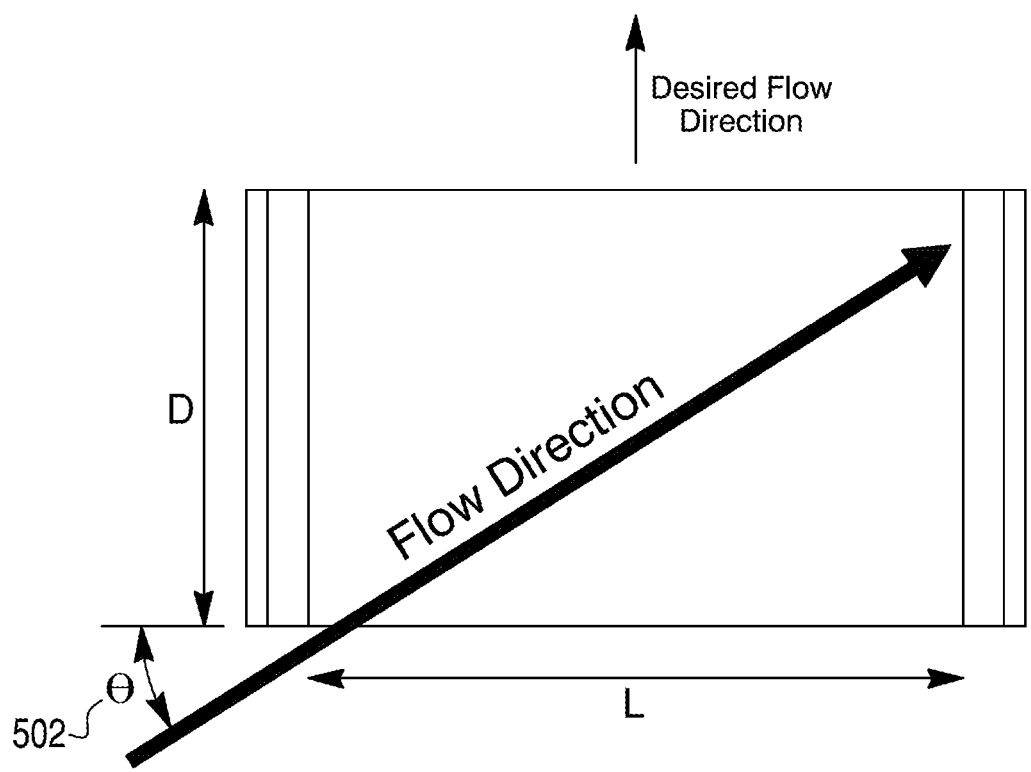
FIG. 5 illustrates a close-up cross-sectional view of a portion of the vane plate illustrated in FIG. 2, according to an embodiment.

FIG. 5 depicts a close-up cross-sectional view of the vane plate 202 illustrated in FIG. 2. As shown in FIG. 5, the initial direction of flow is at an angle θ 502 with respect to a plane in which the vane plate 202 extends. Dimensions of the plurality of channels 208 (length L, width W, and depth D) are set such that the plurality of first vanes 204 and the plurality of second vanes 206 intercept the flow and direct the flow in a desired (e.g., target) direction, such as the x-direction of the conduit.

Figure 6:
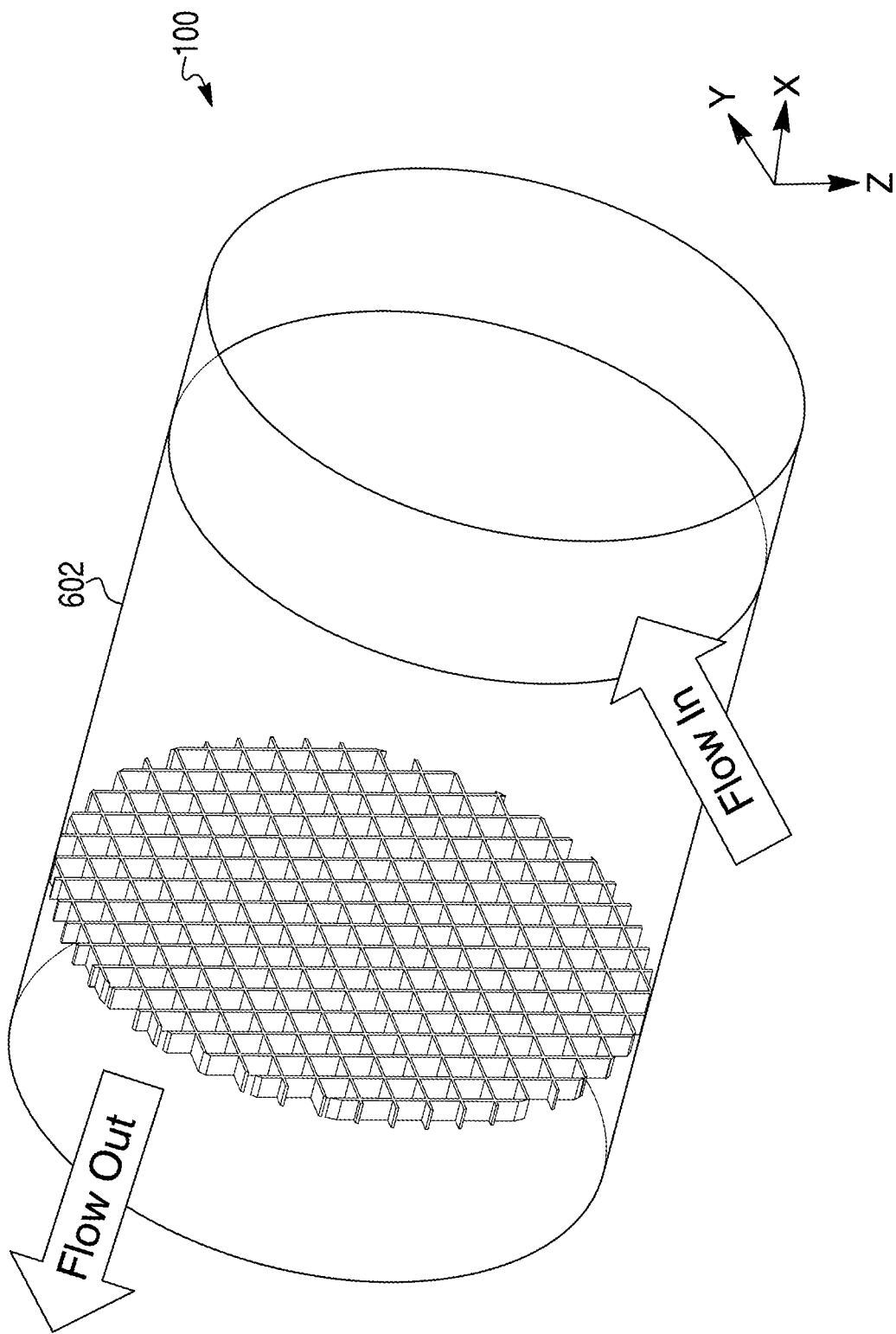
FIG. 6 illustrates a perspective view of an example aftertreatment system that includes the vane plate illustrated in FIG. 2, according to an embodiment.

FIG. 6 depicts a perspective view of an aftertreatment system 100 for converting shear flow into axial flow according to an example embodiment. The aftertreatment system 100 includes an exhaust conduit 602 and a vane plate 202 (e.g., vane plate assembly). The vane plate assembly can be configured to couple with the exhaust conduit 602. For example, the vane plate assembly can be disposed in the exhaust conduit 602. The vane plate 202 can include the vane plate 202 described in FIG. 2-5. The vane plate 202 can be located downstream of the turbocharger. The turbocharger can be located upstream of the aftertreatment system 100. The vane plate 202 can be located at the outlet of the turbocharger. The vane plate 202 can be located upstream of the decomposition chamber 104. The vane plate 202 can be located upstream of an SCR unit 106. In some embodiments, the vane plate 202 can be located upstream of a catalyst (e.g., catalyst unit). The vane plate 202 can be located downstream of the decomposition chamber 104 and upstream of the SCR unit 106. The vane plate 202 can be located in a section of the exhaust conduit where there is shear or swirling flow. The shear or swirling flow can be converted to axial flow.

The vane plate 202 is configured to redirect flow of exhaust gas through the exhaust conduit 602 to be in an axial direction of the exhaust conduit 602. For example, the vane plate 202 can redirect swirling or shear flow of exhaust gas through the exhaust conduit 602 to be axial flow of exhaust gas through the exhaust conduit 602. Swirling or shear flow can include flow that is in the z-direction or y-direction. Swirling (e.g., rotational) or shear flow can include flow that is in the direction of the polar axis of the exhaust conduit. Axial flow can include flow that is in the x-direction. Axial flow can include flow that is in the direction of the longitudinal axis of the exhaust conduit.

Figure 7:
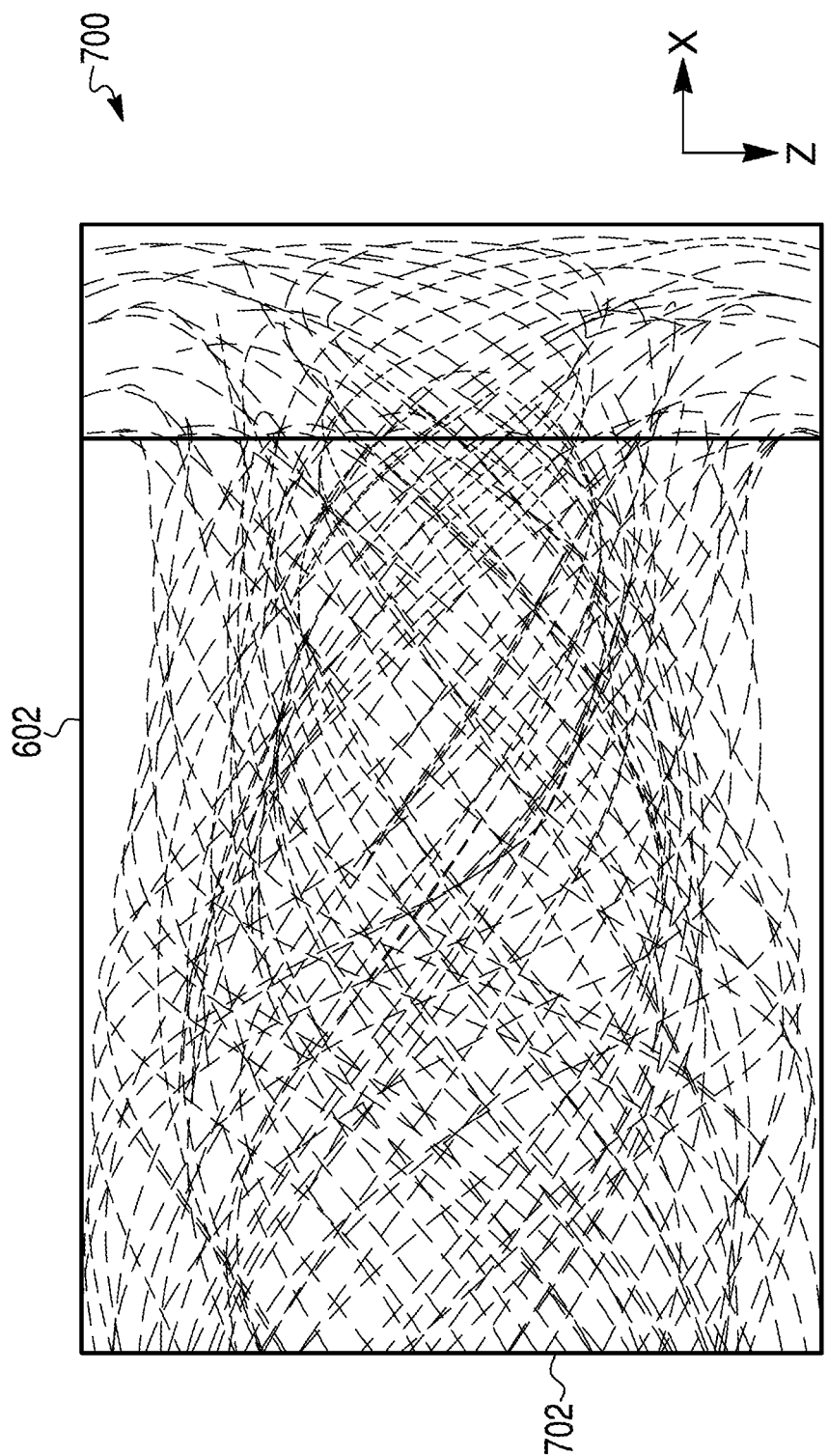
FIG. 7 is an illustration of the prior art showing a baseline simulation of flow velocity.

An illustration of a known system without a vane plate 202 is shown in FIG. 7. FIG. 7 is an illustration of the prior art showing a baseline simulation of flow velocity. The simulation was prepared using the computation fluid dynamics software tool ANSYS CFX. A CFX analysis was performed on a cylinder. Rotational or swirling flow was generated by entering from the right side (e.g., right end) of the cylinder and exiting out of the left side (e.g., left end) of the cylinder. The simulation was performed on a system 700. The maximum shear velocity at an outlet 702 with no plate was taken as the baseline for the study.

Figure 8:
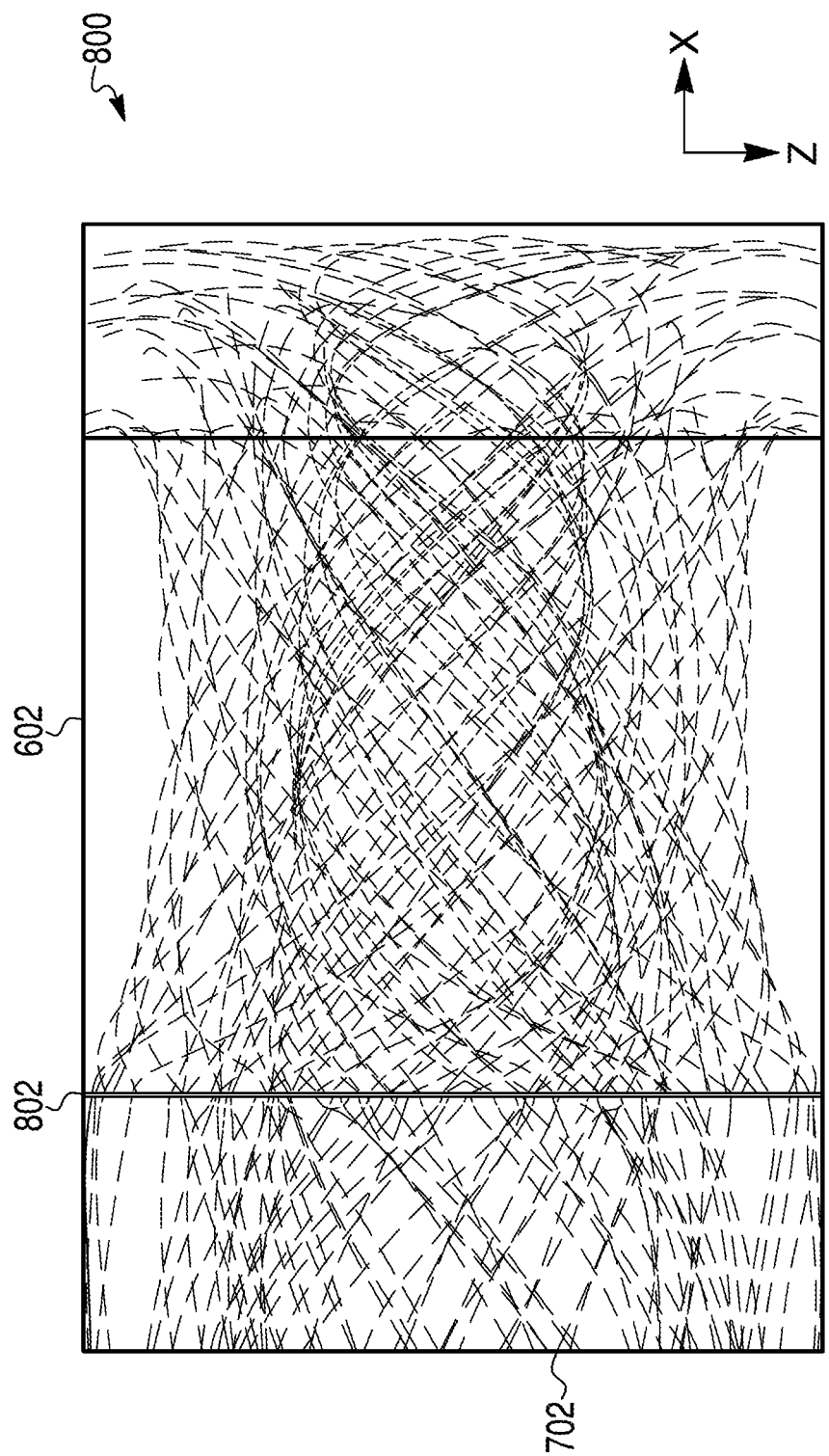
FIG. 8 is an illustration of the prior art showing a simulation of flow velocity in a system with a perforated plate.

An illustration of a known system with a perforated plate 802 is shown in FIG. 8. FIG. 8 is an illustration of the prior art showing a simulation of flow velocity in a system with a perforated plate 802. The simulation was prepared using the computation fluid dynamics software tool ANSYS CFX. A CFX analysis was performed on a cylinder. Rotational or swirling flow was generated by entering from the right side (e.g., right end) of the cylinder and exiting out of the left side (e.g., left end) of the cylinder. The simulation was performed on a system 800 that includes a perforated plate 802 located in an exhaust conduit 602. The maximum shear velocity at an outlet 702 with the perforated plate 802 was reduced approximately 24% from the baseline value. The perforated plate 802 was modeled as a standard sheet metal plate using evenly distributed holes to create an open frontal area of approximately 50%.

Figure 9:
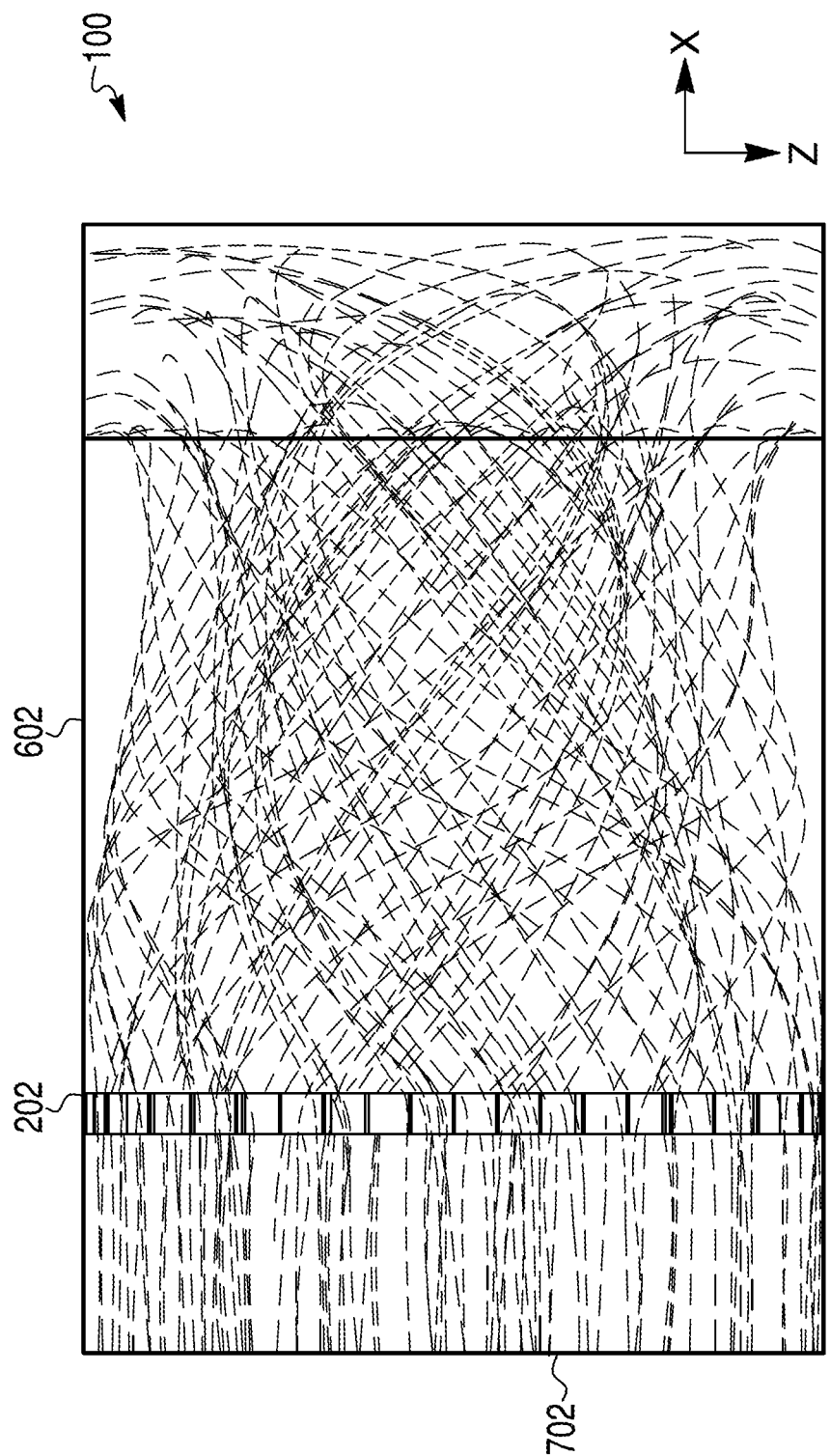
FIG. 9 illustrates a simulation of flow velocity in the example system illustrated in FIG. 6, according to an embodiment.

FIG. 9 depicts a simulation of an example system 100 for converting shear flow into axial flow. The simulation was prepared using the computation fluid dynamics software tool ANSYS CFX. A CFX analysis was performed on a cylinder. Rotational or swirling flow was generated by entering from the right side (e.g., right end) of the cylinder and exiting out of the left side (e.g., left end) of the cylinder. The simulation was performed on a system 100 that includes a vane plate 202 located in an exhaust conduit 602. The maximum shear velocity at the outlet 702 with the vane plate 202 was reduced approximately 62% from the baseline value.

In FIGS. 7-9, the dashed lines represent the velocity (e.g., speed and direction) of the flow path. For example, higher flow speeds are represented by more closely spaced and shorter dashes, and lower flow speeds are represented by less closely spaced and longer dashes. The closer the spacing between dashes, the higher the speed of the flow. The shorter the dashes, the higher the speed of the flow. The further the spacing between dashes, the lower the speed of the flow. The longer the dashes, the lower the speed of the flow. The flow direction is generally from right to left (e.g., right side of the cylinder to left side of the cylinder).

Figure 10:
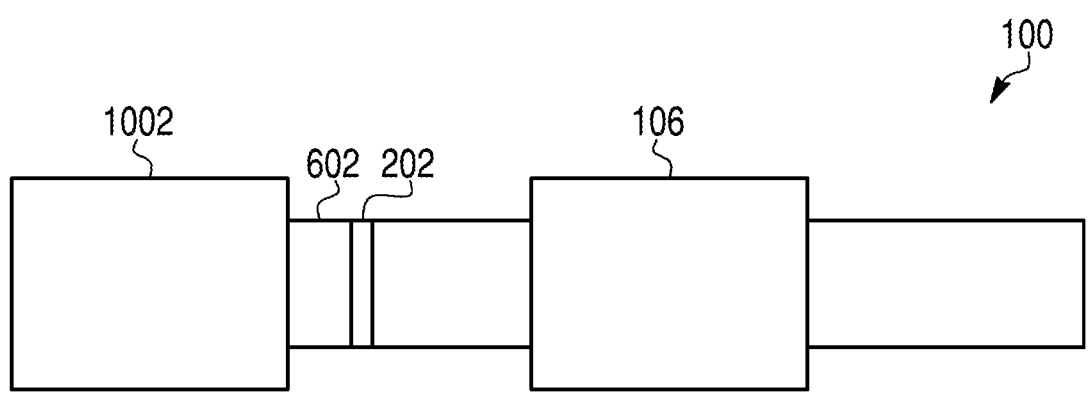
FIG. 10 illustrates a block diagram of an example system for converting shear flow into axial flow, according to an embodiment.

FIG. 10 depicts a block diagram of an example system 100 for converting shear flow into axial flow. In some embodiments, the system 100 includes a turbocharger 1002 to output the exhaust gas. The turbocharger 1002 can output the exhaust gas into the exhaust conduit 602. The exhaust flow exiting an outlet of the turbocharger 1002 can have high magnitude swirling or rotational velocities. The vane plate 202 can redirect the exhaust flow axially and reduce the risk of SCR catalyst damage. In some embodiments, the system 100 includes a SCR unit 106. The system 100 can include a turbocharger 1002 to output the exhaust gas to the SCR unit 106. In some embodiments, the system 100 includes a catalyst. The system can include the turbocharger 1002 to output the exhaust gas to the catalyst. The vane plate 202 can be located downstream of the turbocharger 1002 and upstream of the catalyst unit.

Figure 11:
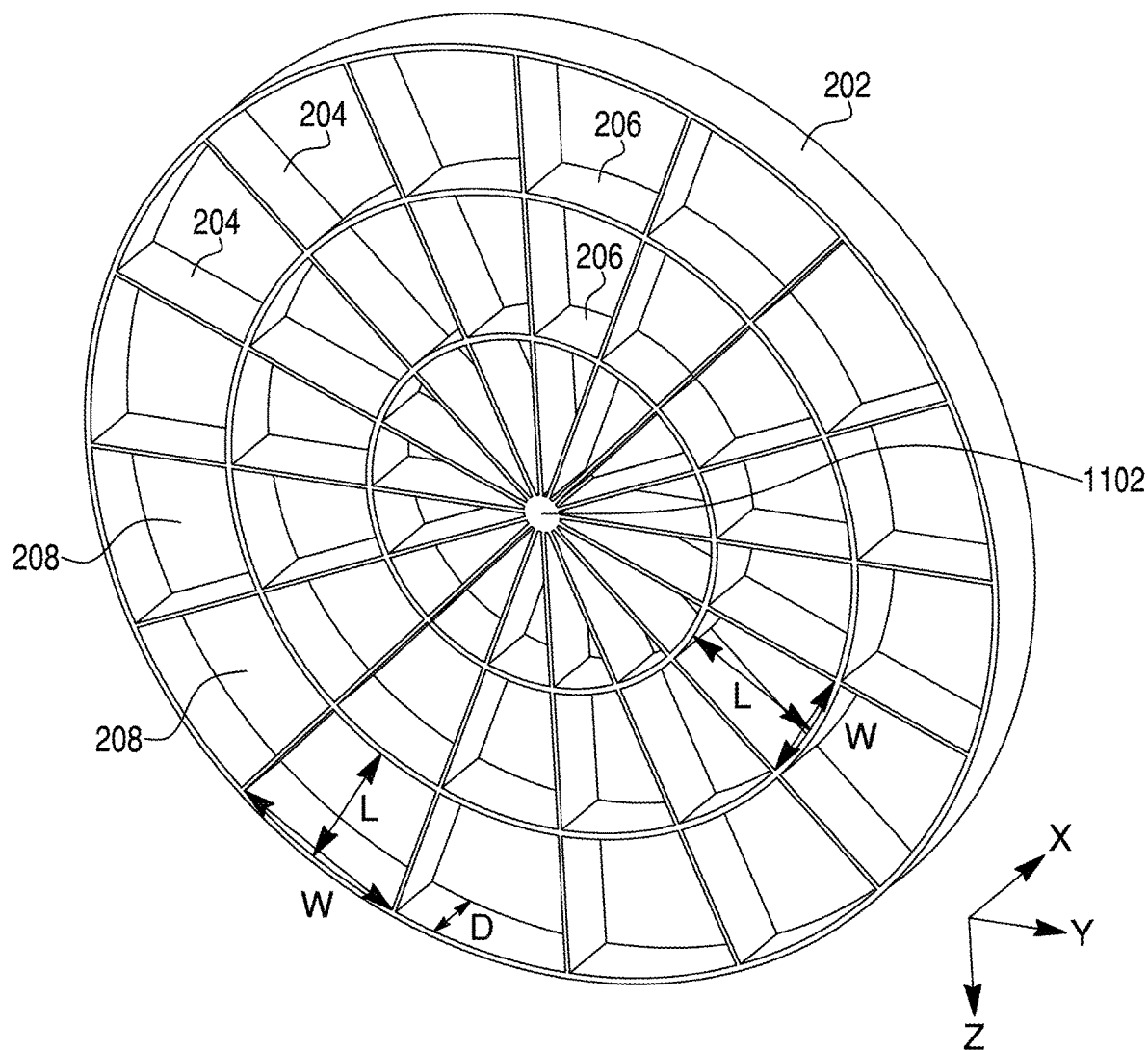
FIG. 11 illustrates a perspective view of an example vane plate for converting shear flow into axial flow, according to an embodiment.

FIG. 11 illustrates a perspective view of an example vane plate 202 for converting shear flow into axial flow, according to an embodiment. The vane plate 202 can include a plurality of first vanes 204 extending in a radial direction. For example, the plurality of first vanes 204 can extend in a radial direction from a central hub 1102. The plurality of first vanes 204 can intersect at a single point or multiple points. The plurality of channels 208 can have a sector-shaped cross-section or an annular sector-shaped cross-section. For example, the plurality of channels 208 adjacent to the central hub 1102 have a sector-shaped cross-section. The plurality of channels 208 adjacent to the plurality of channels 208 having a sector-shaped cross-section can have an annular sector-shaped cross section.

The vane plate 202 can include a plurality of second vanes 206. In some embodiments, the plurality of second vanes 206 can extend in a direction concentric to a point. For example, the plurality of second vanes 206 can extend in a direction concentric to the central hub 1102. The plurality of second vanes 206 can be concentric to the central hub 1102 or multiple points. The plurality of second vanes 206 can intersect the plurality of first vanes 204. The plurality of second vanes 206 can extend concentrically around the central hub 1102.

The plurality of first vanes 204 and the plurality of second vanes 206 can form a plurality of channels 208. The plurality of channels 208 can be formed by the intersection of the plurality of first vanes 204 and the plurality of second vanes 206. A flow of exhaust gas can pass through the plurality of channels 208. The plurality of channels 208 can have a wedge shape, sector shape, or annular sector-shape. The plurality of first vanes 204 and the plurality of second vanes 206 may be integral with one another, so as to be formed of a single piece.

The length L and width W may be in direction perpendicular to the depth D. In the embodiment shown in FIG. 11, the length L and width W of each channel are variable for a single vane plate 202. The plurality of channels 208 are wedge-shaped in a cross-section perpendicular to the x-direction. The length L is the maximum length in a radial direction of a channel. The width W is the maximum width in a direction perpendicular to the radial direction of the channel.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "in fluid communication," and the like, as used herein, mean the two components or objects have a pathway formed between the two components or objects in which a fluid (e.g., exhaust, water, air, gaseous reductant, gaseous ammonia, etc.) may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item, unless specifically stated to the contrary.

What is claimed is:

1. An aftertreatment system comprising:
   an exhaust conduit;
   a decomposition chamber;
   a selective catalytic reduction (SCR) unit at a location downstream of the decomposition chamber; and
   a vane plate located in the exhaust conduit at a location downstream of the decomposition chamber and upstream of the SCR unit, the vane plate comprising:
   a plurality of first vanes; and
   a plurality of second vanes that intersect the plurality of first vanes;
   wherein the plurality of first vanes and the plurality of second vanes form a plurality of channels; and
   wherein all of the plurality of first vanes and all of the plurality of second vanes extend exclusively in a longitudinal direction of the exhaust conduit from an upstream end of the vane plate to a downstream end of the vane plate, such that the vane plate is configured to redirect flow of exhaust gas through the exhaust conduit to be in an axial direction of the exhaust conduit.

2. The aftertreatment system of claim 1, wherein:
   an angle between a first direction in which the plurality of first vanes extend and a second direction in which the plurality of second vanes extend is in a range of 80° to 100°.

3. The aftertreatment system of claim 1, wherein:
   each of the plurality of channels has a rectangular cross-section.

4. The aftertreatment system of claim 3, wherein:
each of the plurality of channels has a depth in a range of 10 mm to 80 mm in the axial direction of the exhaust conduit.

5. The aftertreatment system of claim 3, wherein:
each of the plurality of channels has a length and a width in a range of 5 mm to 105 mm in a direction perpendicular to the axial direction of the exhaust conduit.

6. The aftertreatment system of claim 3, wherein:
each of the plurality of channels has a depth in a range of 10 mm to 80 mm in the axial direction of the exhaust conduit; and
each of the plurality of channels has a length and a width in a range of 5 mm to 105 mm in a direction perpendicular to the axial direction of the exhaust conduit.

7. The aftertreatment system of claim 1, wherein:
a ratio of a cross-sectional area of the plurality of channels perpendicular to the axial direction of the exhaust conduit to a cross-sectional area of the vane plate perpendicular to the axial direction of the exhaust conduit is greater than 60%.

8. The aftertreatment system of claim 1, further comprising:
a turbocharger configured to output the exhaust gas.

9. The aftertreatment system of claim 1, further comprising:
a catalyst unit; and
a turbocharger configured to output the exhaust gas to the catalyst unit,
wherein the vane plate is located downstream of the turbocharger and upstream of the catalyst unit.

10. The aftertreatment system of claim 1, wherein:
the plurality of first vanes extend in radial directions from a central hub; and
the plurality of second vanes extend concentrically around the central hub.

11. The aftertreatment system of claim 10, wherein:
each of the plurality of channels has a depth in a range of 10 mm to 80 mm in the axial direction of the exhaust conduit.

12. The aftertreatment system of claim 1, wherein:
each of the plurality of channels has a sector-shaped cross-section or an annular sector-shaped cross-section.

13. The aftertreatment system of claim 1, wherein each of the plurality of first vanes and each of the plurality of second vanes extend exclusively in a longitudinal direction of the exhaust conduit from an upstream end of the vane plate to a downstream end of the vane plate.

* * * * *